Patented Jan. 4, 1927.

1,613,402

UNITED STATES PATENT OFFICE.

HAROLD MAXWELL-LEFROY, OF LONDON, ENGLAND, ASSIGNOR TO THE GRAESSER MONSANTO CHEMICAL WORKS LIMITED, OF RUABON, NORTH WALES, A BRITISH COMPANY.

EXTERMINATING INJURIOUS FORMS OF LIFE AND COMPOSITION THEREFOR.

No Drawing. Application filed June 15, 1925, Serial No. 37,348, and in Great Britain May 13, 1925.

This invention relates to an improved process for the extermination of insects, especially flies, fly larvæ and fly maggots, and to compositions therefor.

The inventor has discovered as the result of extensive experiments, that monochlornaphthalene acts as a specific poison for flies even at comparatively low concentrations such as one part by volume per million of air and yet, even when this concentration is largely exceeded, the substance is not injurious to mammals.

According to the present invention I produce within the space to be treated or locally round the insects to be exterminated, a lethal concentration of monochlornaphthalene or monobromnaphthalene, or of mixtures containing the same in the gaseous or atomized form.

The lethal concentration may be produced locally or throughout the whole room to be treated. Suitable ways of producing the vapour are by heating the liquid, by heating a solid composition containing the liquid (avoiding decomposition by excessive heat), or by atomizing the liquid in a suitable atomizer or nebulizer.

An important feature of the invention consists in atomizing or spraying a solution of monohalogenated naphthalene in a hydrocarbon oil of high flash point.

The invention will be illustrated by the following examples.

Example 1.

Evaporate one ounce of liquid monochlornaphthalene by heating over a flame, or by pouring on to hot sand, within a closed room of 1000 cubic feet capacity.

Example 2.

Atomize a mixture of three parts of monochlornaphthalene and one part of the paraffin hydrocarbon known to the trade as B. O. 300. This is a burning oil with an ignition or fire-point of 300° F.; such an oil as is used in domestic lamps with this ignition point is particularly suitable. This may be applied locally in parts of a room infested by flies or throughout the whole room. It is preferable to add a substance of agreeable smell such as pine oil or aniseed.

Example 3.

Make a candle of sawdust or carbon containing say 25% of monochlornaphthalene and burn this in known manner. Any combustible material is suitable which burns without giving off objectionable products and at a temperature which will volatilize the monochlornaphthalene without decomposition. The candles may be moulded under pressure using a binder such as aromatic gum if necessary. To increase the combustibility a small quantity of potassium nitrate or other oxidizing agent may be incorporated.

Example 4.

Impregnate kieselguhr with monochlornaphthalene and form tablets therefrom. Heat these tablets to a temperature to vaporize the material e. g. on a hot iron plate. If desired a binding agent may be incorporated.

In the above examples (including Example 2) the treatment is effected in the gas phase.

Example 5.

Incorporate 10% of monochlornaphthalene in an ordinary sheep dip.

Alternatively mix the monochlornaphthalene with 10% to 90% of a soothing oil such as cotton seed oil. This may be used for killing insects on sheep.

Example 6.

To destroy insects on ponds or solid surfaces, apply a solution of one part of monochlornaphthalene in nine parts of kerosene.

If one part of the polychlorinated derivatives (e. g. trichlor or hexachlor) is added to this solution, a permanent moth-proof effect can be obtained, by impregnating fabrics therewith since the trichlor body is much less volatile than the monochlor body.

Example 7.

Emulsify ½ lb. of monochlornaphthalene with 5 lbs. of soft soap and one gallon of water. Dilute with 100 lbs. of water for use as a plant spray.

*Example 8.*

Incorporate monochlornaphthalene in soap. Dissolve this composition in water for use as above.

*Example 9.*

Dust the places to be treated with very finely divided kieselguhr which has absorbed about 30% of its own weight of monochlornaphthalene. The monochlornaphthalene may also be added to the known insect powders.

I am aware that certain chlorinated organic compounds e. g. paradichlorbenzene have been used to preserve materials against attacks by moths but these substances do not exert the specific toxic action on flies for example such as is possessed by the bodies used in my invention.

Monobromnaphthalene may be used instead of monochlornaphthalene in any of the above examples.

I declare that what I claim is:—

1. The process of exterminating insects which consists in exposure to a lethal concentration of monohalogenated naphthalene.

2. The process of exterminating insects which consists in exposure to a lethal concentration of monochlornaphthalene.

3. The process of exterminating insects which consists in exposing them to a liquid containing monohalogenated naphthalene.

4. Insecticides or fungicides containing monohalogenated naphthalene.

5. An insecticide consisting of a mixture of monohalogenated naphthalene with a hydrocarbon of high flash point.

6. An insecticide consisting of a mixture of kerosene and monochlornaphthalene.

In witness whereof, I have hereunto signed my name this 29th day of May, 1925.

HAROLD MAXWELL-LEFROY.